US012621413B2

(12) United States Patent
Sample et al.

(10) Patent No.: US 12,621,413 B2
(45) Date of Patent: May 5, 2026

(54) SYSTEMS AND METHODS FOR UPDATING A SECURITY USER INTERFACE BASED ON SCHEDULED MODES

(71) Applicant: Johnson Controls Tyco IP Holdings LLP, Milwaukee, WI (US)

(72) Inventors: Benjamin Sample, Fishers, IN (US); Adam Sandler, Fishers, IN (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 377 days.

(21) Appl. No.: 18/194,485

(22) Filed: Mar. 31, 2023

(65) Prior Publication Data

US 2024/0333878 A1     Oct. 3, 2024

(51) Int. Cl.
| | |
|---|---|
| *H04N 7/18* | (2006.01) |
| *G06T 11/20* | (2006.01) |
| *H04N 23/667* | (2023.01) |
| *H04N 23/90* | (2023.01) |

(52) U.S. Cl.
CPC ........... *H04N 7/181* (2013.01); *G06T 11/206* (2013.01); *H04N 23/667* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 2005/0055727 A1* | 3/2005 | Creamer ............ | H04N 1/00838 348/E5.042 |
| 2014/0078300 A1 | 3/2014 | Tine et al. | |
| 2015/0193127 A1* | 7/2015 | Chai ...................... | G06F 3/0482 715/719 |
| 2016/0357762 A1* | 12/2016 | Aghdasi .............. | G06F 16/7867 |
| 2019/0191123 A1* | 6/2019 | Andersen ........... | H04N 21/4316 |
| 2020/0311468 A1* | 10/2020 | Kim ...................... | H04W 4/021 |
| 2022/0345623 A1 | 10/2022 | Mcrae | |
| 2023/0127421 A1* | 4/2023 | Trépanier .............. | G11B 27/34 715/720 |

OTHER PUBLICATIONS

Xiaomi, Mi Home Security Camera 360° 1080P, 10 pages.
Apple, Set up security cameras in Home on iPhone.

* cited by examiner

*Primary Examiner* — Duc Nguyen
*Assistant Examiner* — Assad Mohammed
(74) *Attorney, Agent, or Firm* — ArentFox Schiff LLP

(57) ABSTRACT

Example implementations include a method, apparatus and computer-readable medium for controlling a user interface of a video monitoring system, comprising generating, at a first time, a graphical user interface that depicts a first plurality of camera views that correspond to a first camera view configuration of a first security mode captured from cameras installed in an environment. The implementations further include detecting a start of a second security mode at a second time and updating the graphical user interface to depict a second plurality of camera views that correspond to a second camera view configuration of the second security mode in response to detecting the start of the second security mode. Additionally, the implementations further include detecting an end of the second security mode at a third time and updating the graphical user interface to a third camera view configuration of a third security mode.

26 Claims, 6 Drawing Sheets

400

Generating, at a first time, a graphical user interface that depicts a first plurality of camera views that correspond to a first camera view configuration of a first security mode captured from cameras installed in an environment

402

Detecting a start of a second security mode at a second time

404

Updating the graphical user interface to depict a second plurality of camera views that correspond to a second camera view configuration of the second security mode in response to detecting the start of the second security mode

406

Detecting an end of the second security mode at a third time

408

Updating the graphical user interface to depict a third plurality of camera views that correspond to a third camera view configuration of a third security mode in response to detecting the end of the security mode

400
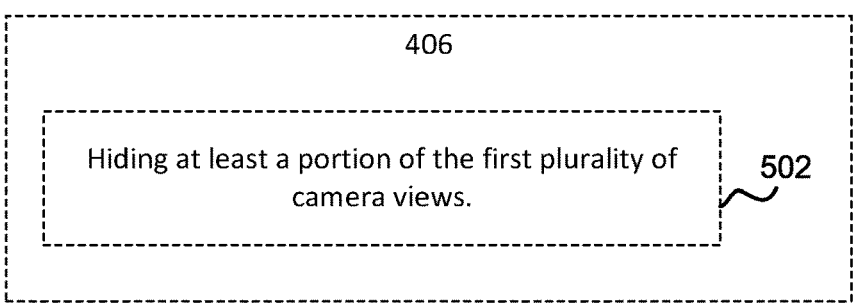
Fig. 5
400
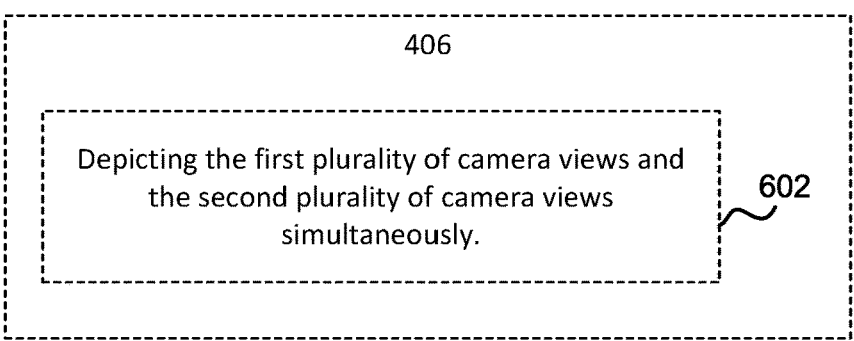
Fig. 6
400
Generating, for display on the graphical user interface, a timeline indicating start times and end times of a plurality of security modes for the environment, wherein the plurality of security modes comprises at least two of the first security mode, the second security mode, or the third security mode.
702
Fig. 7

400

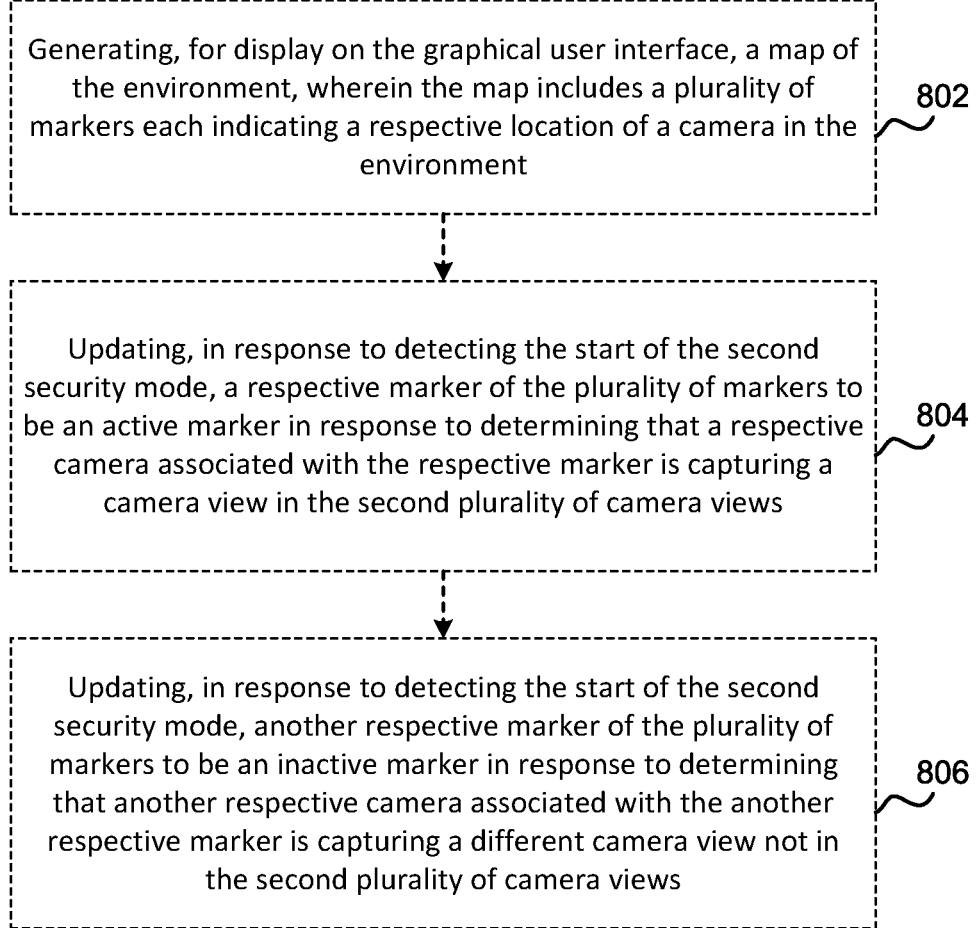

Generating, for display on the graphical user interface, a map of the environment, wherein the map includes a plurality of markers each indicating a respective location of a camera in the environment

802

Updating, in response to detecting the start of the second security mode, a respective marker of the plurality of markers to be an active marker in response to determining that a respective camera associated with the respective marker is capturing a camera view in the second plurality of camera views

804

Updating, in response to detecting the start of the second security mode, another respective marker of the plurality of markers to be an inactive marker in response to determining that another respective camera associated with the another respective marker is capturing a different camera view not in the second plurality of camera views

SYSTEMS AND METHODS FOR UPDATING A SECURITY USER INTERFACE BASED ON SCHEDULED MODES

TECHNICAL FIELD

The described aspects relate to security camera systems.

BACKGROUND

Aspects of the present disclosure relate generally to security camera systems, and more particularly, to updating a security user interface based on scheduled modes.

In a conventional security system, the views of a particular environment are static. For example, multiple cameras may be installed in an office space, each capturing a different portion of the office space. A user interface of the conventional security system may simultaneously depict the respective feed from each camera in a grid-like manner. Depending on the user interface structure, some of the feeds may be hidden (accessed by scrolling/selecting), while others may need to be resized/repositioned for proper viewing by a security officer. In other words, any changes to the static view require manual intervention by the security officer.

Manual intervention is ineffective because a security officer may be unable to determine which views are relevant in a timely manner. By the time the officer manually updates the user interface, important security events in the environment may have been missed. In fact, there is no guarantee that the updates the officer makes to the user interface will properly depict important views. Moreover, manual adjustments are time-consuming and inefficient.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example aspect includes a method for controlling a user interface of a video monitoring system, comprising generating, at a first time, a graphical user interface that depicts a first plurality of camera views that correspond to a first camera view configuration of a first security mode captured from cameras installed in an environment. The method further includes detecting a start of a second security mode at a second time. Additionally, the method further includes updating the graphical user interface to depict a second plurality of camera views that correspond to a second camera view configuration of the second security mode in response to detecting the start of the second security mode. Additionally, the method further includes detecting an end of the second security mode at a third time. Additionally, the method further includes updating the graphical user interface to depict a third plurality of camera views that correspond to a third camera view configuration of a third security mode in response to detecting the end of the second security mode.

Another example aspect includes an apparatus for controlling a user interface of a video monitoring system, comprising a memory and a processor coupled with the memory. The processor is configured to generate, at a first time, a graphical user interface that depicts a first plurality of camera views that correspond to a first camera view configuration of a first security mode captured from cameras installed in an environment. The processor is further configured to detect a start of a second security mode at a second time. Additionally, the processor further configured to update the graphical user interface to depict a second plurality of camera views that correspond to a second camera view configuration of the second security mode in response to detecting the start of the second security mode. Additionally, the processor further configured to detect an end of the second security mode at a third time. Additionally, the processor further configured to update the graphical user interface to depict a third plurality of camera views that correspond to a third camera view configuration of a third security mode in response to detecting the end of the second security mode.

Another example aspect includes an apparatus for controlling a user interface of a video monitoring system, comprising means for generating, at a first time, a graphical user interface that depicts a first plurality of camera views that correspond to a first camera view configuration of a first security mode captured from cameras installed in an environment. The apparatus further includes means for detecting a start of a second security mode at a second time. Additionally, the apparatus further includes means for updating the graphical user interface to depict a second plurality of camera views that correspond to a second camera view configuration of the second security mode in response to detecting the start of the second security mode. Additionally, the apparatus further includes means for detecting an end of the second security mode at a third time.

Additionally, the apparatus further includes means for updating the graphical user interface to depict a third plurality of camera views that correspond to a third camera view configuration of a third security mode in response to detecting the end of the second security mode.

Another example aspect includes a computer-readable medium having instructions stored thereon for controlling a user interface of a video monitoring system, wherein the instructions are executable by a processor to generate, at a first time, a graphical user interface that depicts a first plurality of camera views that correspond to a first camera view configuration of a first security mode captured from cameras installed in an environment. The instructions are further executable to detect a start of a second security mode at a second time. Additionally, the instructions are further executable to update the graphical user interface to depict a second plurality of camera views that correspond to a second camera view configuration of the second security mode in response to detecting the start of the second security mode. Additionally, the instructions are further executable to detect an end of the second security mode at a third time. Additionally, the instructions are further executable to update the graphical user interface to depict a third plurality of camera views that correspond to a third camera view configuration of a third security mode in response to detecting the end of the second security mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 4 is a flowchart of an example of a method for controlling a user interface of a video monitoring system;

FIG. 5 is a flowchart of additional aspects of the method of FIG. 4;

FIG. 6 is a flowchart of additional aspects of the method of FIG. 4;

FIG. 7 is a flowchart of additional aspects of the method of FIG. 4; and

FIG. 8 is a flowchart of additional aspects of the method of FIG. 4.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods for updating a security user interface based on scheduled modes. Based on the shortcomings of conventional security systems, it is evident that security personnel will benefit from the ability to adjust views of their live video based on a pre-defined schedule. As will be described in the present disclosure, a user may create one or more modes around a particular schedule and have the default views of their environment automatically adjust in accordance with the mode(s) and schedule. A timeline on the user interface may depict the schedule and the different modes. When a given time period arrives for a particular mode, the default camera views may automatically update to highlight the specific areas associated with the mode.

For example, in a school environment, a user may create a passing period mode that shows the camera views from the school hallways and hides other non-important camera views during passing periods, e.g. the time between class periods. Accordingly, a security officer may be better able to keep an eye on students and staff as they transition into different classrooms. In another example, for a concert, a user (e.g., a member of an entertainment venue) may create a concert mode that enables a security officer to focus camera views on specific event halls from 9 pm-11 pm when a concert is taking place. In yet another example, in a store setting, a user may create a store closed mode that shifts the views from cameras situated inside a department store to views from cameras outside of the department store (e.g., facing the store entry points) during off or closed hours.

Figure 1:
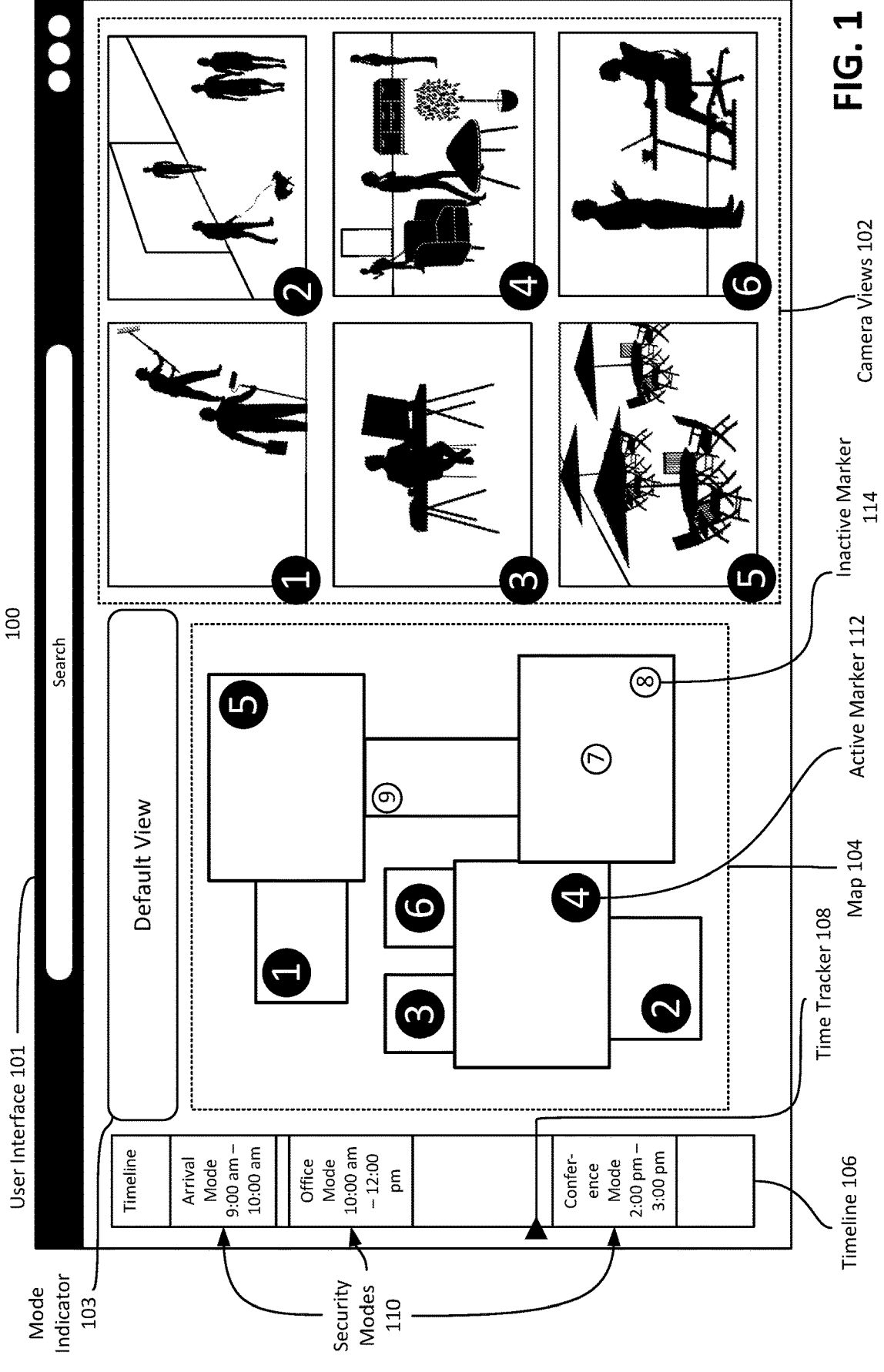
FIG. 1 is a diagram of a user interface in a first camera view configuration, in accordance with exemplary aspects of the present disclosure.

FIG. 1 is a diagram 100 of a user interface 101 in a first camera view configuration, e.g., a default view, in accordance with exemplary aspects of the present disclosure. The user interface described in the present disclosure is generated by a user interface component (described in FIG. 3). The user interface 101 includes one or more camera views 102, which in this example, which should not be construed as limiting, includes six camera feeds. Each camera feed may be captured from a different camera in an environment. Suppose that the environment is an office building with nine rooms. Map 104 depicts a layout of the environment and labels the physical location of each camera. For example, nine cameras are labelled in map 104 and each camera is in a different room within the environment.

Timeline 106 depicts a schedule of security modes 110 during which respective sets of cameras are configured for display in the camera view 102 of the user interface 101. Suitable examples of security modes 110 include, but are not limited to, an "arrival mode" that starts at 9:00 am and ends at 10:00 am, an "office mode" that starts at 10:00 am and ends at 12:00 pm, and a "conference mode" that starts at 2:00 pm and ends at 3:00 pm. During arrival mode, employees may be entering the office building, and the system may be configured such that the camera views 102 depicted on the user interface 101 may be from cameras near one or more entrances to the building. During office mode, a majority of employees may be within their offices, and the system may be configured such that the camera view 102 depicted on the user interface 101 may be from cameras within/outside the offices. During conference mode, the employees may gather in a conference room, and the system may be configured such that the camera views 102 depicted on the user interface 101 may be from cameras near and within the conference room. It should be understood that any number of different security modes 110 associated with any sets of cameras may be configured according to the present aspects.

Time tracker 108 represents a current time on timeline 106. For example, as time passes, time tracker 108 may change position on timeline 106 to indicate the current time and provide a user with a clear indication of a current security mode, an upcoming security mode, and/or a past security mode. It should be noted that the visual representation of timeline 106 can be different than the representation shown in diagram 100. For example, timeline 106 may be oriented horizontally, presented as a clock, presented as a time table, etc.

As noted above, each security mode 110 corresponds to a different camera view configuration. For example, diagram 100 represents the user interface at a first time (e.g., t1). Accordingly, a user interface component 315 (described below) generates the user interface 101, which depicts a first plurality of camera views that correspond to a first camera view configuration including video feeds captured from cameras installed in an environment. FIG. 1 depicts a "default view" as the first camera view configuration, wherein the default view is a view in which no security mode is active (as seen by time tracker 108 being at a time where no specific security mode is shown). The default view corresponds to certain set of camera, or all cameras, in the environment being a part of the camera views 102. It should be understood that, in some aspects, the default view may be one of security modes 110.

Map 104 may visually depict the active and non-active cameras whose feeds are shown in camera views 102. For example, each camera may be depicted by an active marker 112 (e.g., a large black circle with a camera identifier) and an inactive marker 114 (e.g., a relatively smaller white circle with a camera identifier). A camera identifier may be any visual indicator or unique combination of characters that represent a given camera. For example, a camera identifier may be an image of the camera, a visual icon representing a camera, a MAC address, a name, a code, etc. In diagram 100, each camera is assigned a number between 1 and 9 as its camera identifier. As depicted, cameras 1, 2, 3, 4, 5, and 6 are active cameras (i.e., their feeds are being shown in camera views 102). Cameras 7, 9, and 8 are inactive cameras (i.e., their feeds are hidden in camera views 102). Each video feed in camera views 102 is also labelled by the camera identifier to enable a user to view the feed in camera views 102 and quickly determine the location of the camera in map 104. It should be noted that the label of each camera view may be the same as the camera identifier described above, or it may be a different label associated with the camera or the camera identifier. Additionally, in some aspects, user interface 101 and/or map 104 may provide a mode indicator 103 associated with map 104, wherein mode indicator 103 may be any words or characters or graphics that represent a given view or mode, such as the label "Default View" in FIG. 1.

Thus, in the event of a security issue (e.g., a fire, unauthorized access, a theft, etc.), a security officer accessing the user interface 101 can shorten the amount of time to resolve the security issue using the camera view 102 based on the security mode 110, as well as using the camera identifier or camera labeling quick localization feature.

Figure 2:
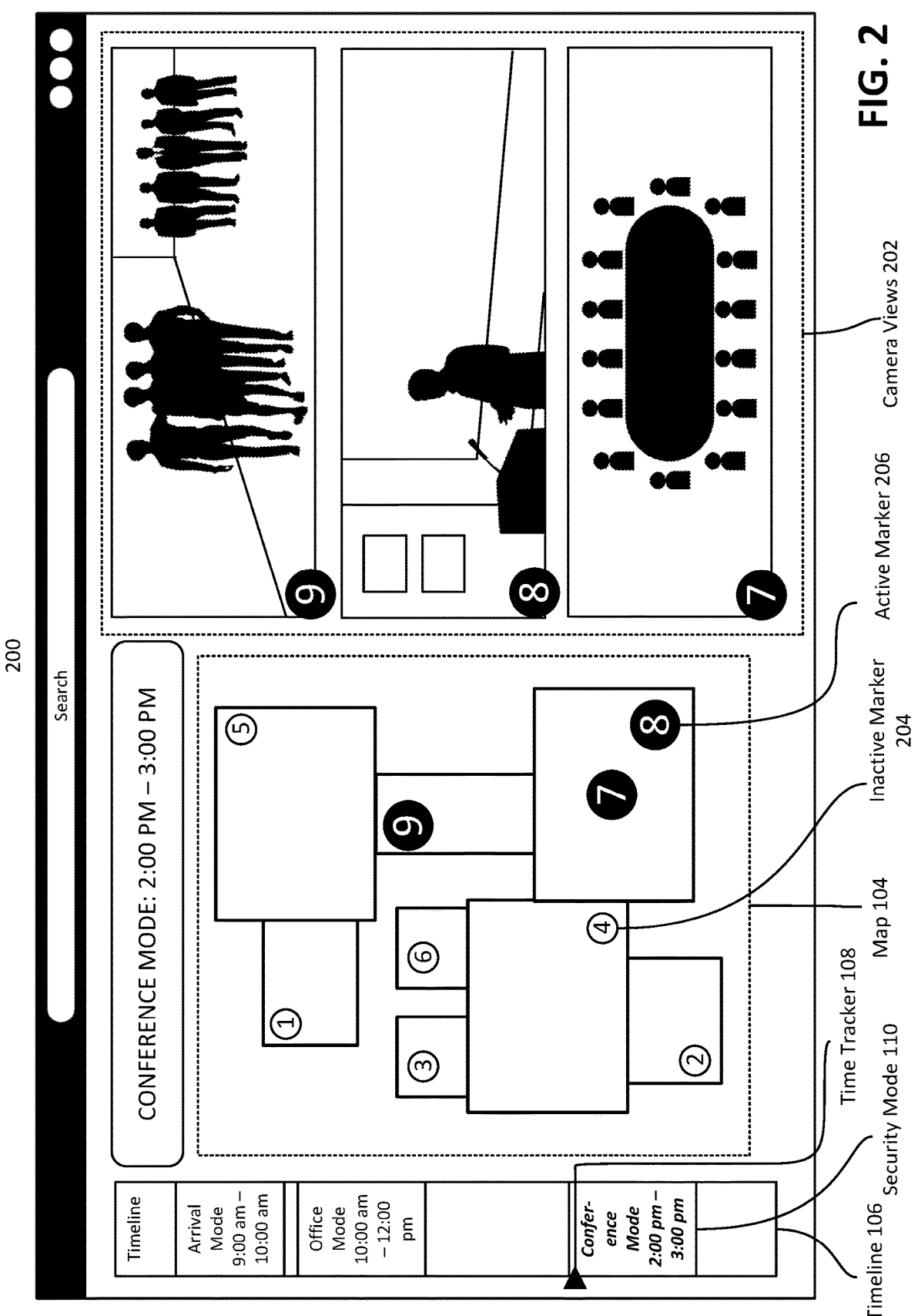
FIG. 2 is a diagram of the user interface in a second camera view configuration corresponding to a security mode, in accordance with exemplary aspects of the present disclosure.

FIG. 2 is a diagram 200 of the user interface 101 in a different camera view configuration corresponding to a security mode, in accordance with exemplary aspects of the present disclosure. For example, at time t2 (e.g., 2:00 pm), a user interface component may detect a start of security mode 110 (e.g., conference mode). In response, the user interface component 315 (discussed below) may then update the user interface 101 to depict a second plurality of camera views 202 that correspond to a second camera view configuration of conference mode configuration of security mode 110. As mentioned before, conference mode may correspond to a time when employees enter a conference room. The user interface component 315 may refer to a database or memory that stores a set of one or more camera identifiers and start/end times of each security mode. For conference mode, the database may indicate that at 2:00 pm, cameras 7, 8, and 9 are the active cameras whose feeds should be shown on the user interface 101 in the camera views 202.

The user interface component 315 may update map 104 by assigning inactive marker 204 to cameras 1-6 and active marker 206 to cameras 7-9. The initial display of camera views 102, e.g., during the default mode of FIG. 1, is changed to camera views 202, which depicts the video feeds from cameras 7-9. In some aspects, subsequent to the end of the conference mode configuration of security mode 110 (e.g., at 3:00 pm), the user interface component 315 may update the user interface 101 to return to the default view shown in diagram 100. This is because there are no other security modes immediately after security mode 110 according to timeline 106.

A user of user interface 101 may create any number of security modes 110, which may apply to certain times and/or to certain days. When creating a security mode 110, the user may select a time window for when the security mode 110 is to be active. For example, the system may receive the user input of a time window from 4:00 pm-4:15 pm on a Monday. The user may further indicate whether the security mode 110 is reoccurring. For example, the security mode 110 may be happen every other hour, daily, on weekdays, on weekends, weekly (e.g., every Monday), monthly (e.g., the first Monday of every month), yearly, on holidays, on non-holidays, etc. Additionally, during the creation of the security mode 110, the user may build a camera view configuration by providing user inputs as to selected camera feeds from selected cameras that are to be shown on the user interface 101 during the security mode 110. For example, the user may select cameras 1, 5, and 9.

The user interface component 315 may receive the user selections and identify any discrepancies. For example, a discrepancy may be a conflicting (e.g., overlapping) time with a pre-existing security mode. In response to identifying a time discrepancy, the user interface component 315 may prompt the user to reschedule the security mode or change the time window of the pre-existing security mode. Another discrepancy may be an unavailable camera during the indicated time window. For example, the user may select a time window during when a camera undergoes maintenance (e.g., a reboot, a software update, a calibration, etc.). Even if the camera is unavailable for a brief period of time, the user interface component 315 may alert the user of a potential interruption in the video feed during the security mode. In some aspects, the user interface component 315 may recommend a different camera (e.g., another camera identified as being located nearby the selected camera, e.g., based on location information for each camera and/or map 104) from which to provide a video feed during any anticipated downtime. In response to determining that all discrepancies have been resolved or dismissed by the user, the user interface component 315 may save the security mode in a schedule and begin monitoring for the security mode.

It should be noted that the appearance of the user interface 101 is not limited to the appearance shown in diagrams 100 and 200. For example, if the user interface 101 is accessed on a desktop computer, the appearance may be similar to diagrams 100 and 200. However, if the user interface 101 is accessed on a device with a relatively smaller display area, such as a smartphone or personal assistant device, the user interface component 315 may generate a mobile version of the user interface 101. Accordingly, the positions, orientations, and look of the camera views, environment map, and the timeline may change.

Figure 3:
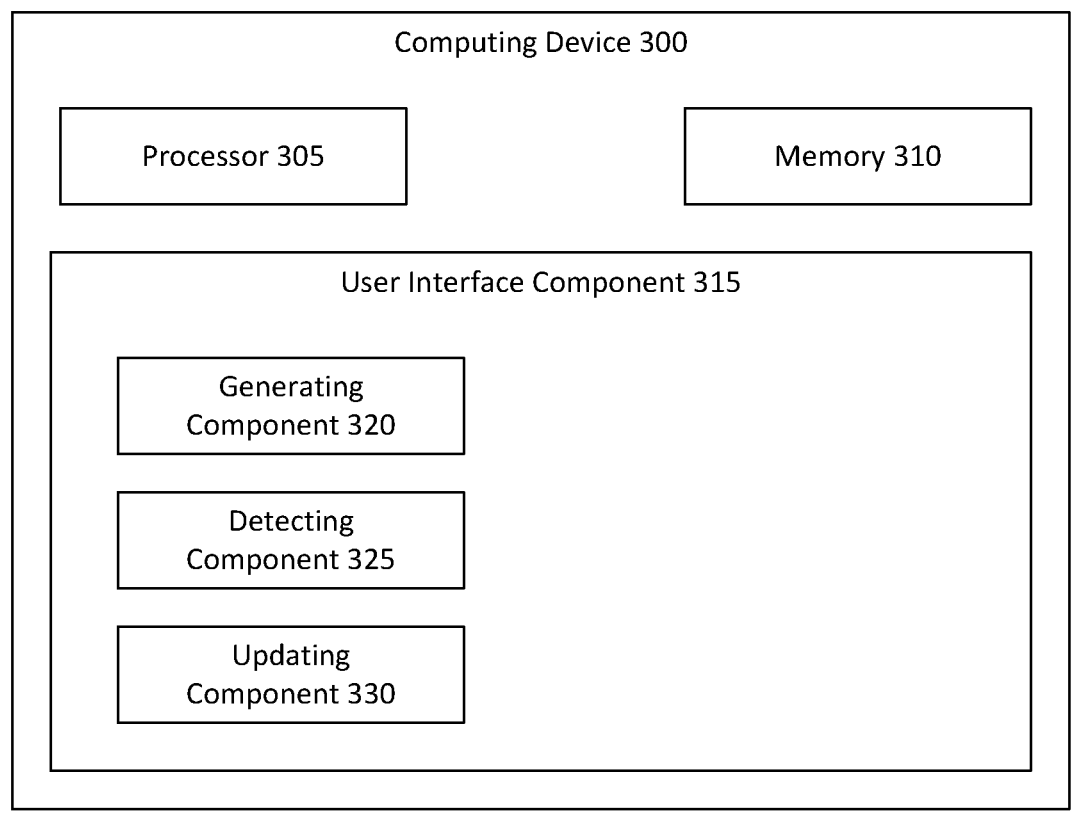
FIG. 3 is a block diagram of an example of a computer device having components configured to perform a method for controlling a user interface of a video monitoring system.

Referring to FIG. 3 and FIG. 4, in operation, computing device 300 may perform a method 400 for controlling a user interface of a video monitoring system, via execution of user interface component 315 by processor 305 and/or memory 310.

At block 402, the method 400 includes generating, at a first time, a graphical user interface that depicts a first plurality of camera views that correspond to a first camera view configuration of a first security mode captured from cameras installed in an environment. For example, in an aspect, computing device 300, processor 305, memory 310, user interface component 315, and/or generating component 320 may be configured to or may comprise means for generating, at a first time, a graphical user interface that depicts a first plurality of camera views (e.g., camera views 102) that correspond to a first camera view configuration of a first security mode captured from cameras installed in an environment.

For example, user interface component 315 may depict video feeds from cameras 1-6 as shown in FIG. 1. The first security mode may be associated with "default view" or default mode in diagram 100 and the first time may be after 12:00 pm but before 2:00 pm (e.g., the start time of the conference mode).

At block 404, the method 400 includes detecting a start of a second security mode at a second time. For example, in an aspect, computing device 300, processor 305, memory 310, user interface component 315, and/or detecting component 325 may be configured to or may comprise means for detecting a start of a second security mode at a second time.

For example, user interface component 315 may detect that the current time is 2:00 pm and according to a database, such as memory 310, that stores security mode information, the current time is within a time window of a different configured security mode (e.g., "conference mode") relative to a current security mode or view.

At block 406, the method 400 includes updating the graphical user interface to depict a second plurality of camera views that correspond to a second camera view configuration of the second security mode in response to detecting the start of the second security mode. For example, in an aspect, computing device 300, processor 305, memory 310, user interface component 315, and/or updating component 330 may be configured to or may comprise means for updating the graphical user interface to depict a second plurality of camera views (e.g., camera views 202) that correspond to a second camera view configuration of the second security mode in response to detecting the start of the second security mode.

For example, the camera views of the user interface 101 may change from camera view 102 in diagram 100 to camera views 202 in diagram 200. It should be noted that this is one example, and the switch from camera views 102 at a first time to camera views 202 at a second time may be between any two sets of different cameras configured for each security mode. When a new security mode starts and/or an old security mode ends, user interface component 315 identifies the camera views that correspond to the new security mode and updates the user interface 101.

In an alternative or additional aspect, the second plurality of camera views includes at least one different camera view than the first plurality of camera views. As shown in FIG. 2, for example, all of the video feeds in camera views 202 are different as compared to the feeds in camera views 102.

In an alternative or additional aspect, the cameras capturing the first plurality of camera views are located in different areas of the environment than cameras capturing the second plurality of camera views. Referring to FIGS. 1 and 2, camera views 102 are provided by cameras 1-6, and camera views 202 are provided by cameras 7-9, which are located in different areas from cameras 1-6 as seen in map 104. For instance, based on the corresponding different security modes 110, different sets of cameras may provide views of different areas of an environment that are more important than other areas for the given configured security mode (e.g., covering inside a building during the day, when people are inside, and outside of a building overnight when the building is closed).

At block 408, the method 400 includes detecting an end of the second security mode at a third time. For example, in an aspect, computing device 300, processor 305, memory 310, user interface component 315, and/or detecting component 330 may be configured to or may comprise means for detecting an end of the second security mode at a third time.

For example, user interface component 315 may determine that the current time is 3:00 pm and determine that the second security mode has ended.

At block 410, the method 400 includes updating the graphical user interface to depict a third plurality of camera views that correspond to a third camera view configuration of a third security mode in response to detecting the end of the second security mode. For example, in an aspect, computing device 300, processor 305, memory 310, user interface component 315, and/or updating component 330 may be configured to or may comprise means for updating the graphical user interface to depict a third plurality of camera views that correspond to a third camera view configuration of a third security mode in response to detecting the end of the second security mode. For instance, at 3:00 pm, the user interface component 315 may configure the user interface 101 back to the default view that includes camera views 202 since no other configuration of the security modes 110 has been associated with starting at 3:00 pm.

In an alternative or additional aspect, the third security mode is a same mode as the first security mode. For example, the first security mode and the third security mode may both be a default mode in which the same camera views are displayed. In some aspects, the default may show all camera views in an environment.

It should be noted that although different video feeds are being shown on the user interface by user interface component 315, the cameras that capture the video feeds are not being disabled or stopped in any manner. For example, the cameras of inactive video feeds (i.e., video feeds not prominently shown on the user interface) continue to capture video and security event analysis is still performed by computing device 300 on the captured video (e.g., detect fires, unauthorized persons, etc.). The present disclosure simply shifts the focus of the user to the most relevant camera video feeds, by adjusting the user interface to display the video feeds associated with a current security mode prominently. This improves the user interface 101, allowing the user to reach relevant information faster and perform a remediation action quicker. This also saves computational and memory resources because the user's efforts to search for information on the user interface without guidance are minimized.

Referring to FIG. 5, in an alternative or additional aspect, at block 502, the updating at block 406 of the graphical user interface to depict the second plurality of camera views further comprises hiding at least a portion of the first plurality of camera views. Referring to FIGS. 1 and 2, diagram 100 depicts video feeds from cameras 1-6 and diagram 200 depicts video feeds from cameras 7-9. When the second security mode is entered by the security software, the transition from diagram 100 to diagram 200 occurs as user interface component 315 hides the video feeds from cameras 1-6 so that they are not shown and displays video feeds from cameras 7-9.

Referring to FIG. 6, in an alternative or additional aspect, at block 602, the updating at block 406 of the graphical user interface to depict the second plurality of camera views further comprises depicting the first plurality of camera views and the second plurality of camera views simultaneously. For example, in addition to video feeds from cameras 1-6, user interface component 315 may display video feeds from cameras 7-9.

In some aspects, the second plurality of camera views may be displayed more prominently than the first plurality of camera views. In terms of display "prominence," in an alternative or additional aspect, relative to the first plurality of camera views, the second plurality of camera views have at least one camera view of greater: size, brightness, resolution, frame rate, and/or color saturation. For example, the size (e.g., display area) of camera feed windows in camera views 202 is larger the size of camera feed windows in camera views 102.

Referring to FIG. 7, in an alternative or additional aspect, at block 702, the method 400 may further include generating, for display on the graphical user interface, a timeline indicating start times and end times of a plurality of security modes for the environment, wherein the plurality of security modes comprises at least two of the first security mode, the second security mode, or the third security mode. For example, in an aspect, computing device 300, processor 305, memory 310, user interface component 315, and/or generating component 320 may be configured to or may comprise means for generating, for display on the graphical user interface, a timeline indicating start times and end times of a plurality of security modes for the environment, wherein the plurality of security modes comprises at least two of the first security mode, the second security mode, or the third security mode.

For example, user interface component 315 may generate timeline 106. Suppose that the first security mode is arrival mode, the second security mode is office mode, and the third security mode is conference mode in FIG. 1. In an alternative or additional aspect, the timeline further indicates an active status of a respective one of the plurality of security modes. For example, user interface component 315 may display the active security mode differently (as shown in FIG. 2 conference mode) than an inactive security mode (as shown in FIG. 1 conference mode).

Referring to FIG. 8, in an alternative or additional aspect, at block 802, the method 400 may further include generating, for display on the graphical user interface, a map of the environment, wherein the map includes a plurality of markers each indicating a respective location of a camera in the environment. For example, in an aspect, computing device 300, processor 305, memory 310, user interface component 315, and/or generating component 320 may be configured to or may comprise means for generating, for display on the graphical user interface, a map (e.g., map 104) of the environment, wherein the map includes a plurality of markers (e.g., active marker 112, inactive marker 114, etc.) each indicating a respective location of a camera in the environment.

For example, user interface component 315 may generate map 104, which includes a floor plan of the environment (e.g., outlining rooms, hallways, etc.). The markers on map 104, as shown in diagrams 100 and 200, are circulars with a camera identifier (e.g., a number between 1 and 9). An inactive marker 114 (FIG. 1) or 204 (FIG. 2) is a marker of a first size and visual appearance (e.g. a small white circle) and an active marker 112 (FIG. 1) or 206 (FIG. 2) is a marker of a second size and visual appearance (e.g., a larger black circle).

In this optional aspect, at block 804, the method 400 may further include updating, in response to detecting the start of the second security mode, a respective marker of the plurality of markers to be an active marker in response to determining that a respective camera associated with the respective marker is capturing a camera view in the second plurality of camera views. For example, in an aspect, computing device 300, processor 305, memory 310, user interface component 315, and/or updating component 330 may be configured to or may comprise means for updating, in response to detecting the start of the second security mode, a respective marker of the plurality of markers to be an active marker in response to determining that a respective camera associated with the respective marker is capturing a camera view in the second plurality of camera views.

For example, cameras 7-9 have inactive markers in diagram 100 (corresponding to a first security mode) and user interface component 315 converts those inactive markers to active markers in diagram 200 when the second security mode starts. This is because the video feeds of cameras 7-9 are in the second camera view configuration.

In this optional aspect, at block 806, the method 400 may further include updating, in response to detecting the start of the second security mode, another respective marker of the plurality of markers to be an inactive marker in response to determining that another respective camera associated with the another respective marker is capturing a different camera view not in the second plurality of camera views. For example, in an aspect, computing device 300, processor 305, memory 310, user interface component 315, and/or updating component 330 may be configured to or may comprise means for updating, in response to detecting the start of the second security mode, another respective marker of the plurality of markers to be an inactive marker in response to determining that another respective camera associated with the another respective marker is capturing a different camera view not in the second plurality of camera views.

For example, cameras 1-6 have active markers in diagram 100 (corresponding to a first security mode) and user interface component 315 converts those active markers to inactive markers in diagram 200 when the second security mode starts. This is because the video feeds of cameras 1-6 are not in the second camera view configuration.

The described implementations may further include one or more aspects of the following clauses.

Clause 1. A method for controlling a user interface of a video monitoring system, comprising: generating, at a first time, a graphical user interface that depicts a first plurality of camera views that correspond to a first camera view configuration of a first security mode captured from cameras installed in an environment; detecting a start of a second security mode at a second time; updating the graphical user interface to depict a second plurality of camera views that correspond to a second camera view configuration of the second security mode in response to detecting the start of the second security mode; detecting an end of the second security mode at a third time; and updating the graphical user interface to depict a third plurality of camera views that correspond to a third camera view configuration of a third security mode in response to detecting the end of the second security mode.

Clause 2. The method of clause 1, wherein updating the graphical user interface to depict the second plurality of camera views further comprises hiding at least a portion of the first plurality of camera views.

Clause 3. The method of any preceding clause, wherein relative to the first plurality of camera views, the second plurality of camera views have at least one camera view of greater: size, brightness, resolution, frame rate, or color saturation.

Clause 4. The method of any preceding clause, wherein updating the graphical user interface to depict the second plurality of camera views further comprises depicting the first plurality of camera views and the second plurality of camera views simultaneously.

Clause 5. The method of any preceding clause, wherein the second plurality of camera views includes at least one different camera view than the first plurality of camera views.

Clause 6. The method of any preceding clause, wherein the cameras capturing the first plurality of camera views are located in different areas of the environment than cameras capturing the second plurality of camera views.

Clause 7. The method of any preceding clause, wherein the third security mode is a same mode as the first security mode.

Clause 8. The method of any preceding clause, further comprising: generating, for display on the graphical user interface, a timeline indicating start times and end times of a plurality of security modes for the environment, wherein the plurality of security modes comprises at least two of the first security mode, the second security mode, or the third security mode.

Clause 9. The method of any preceding clause, wherein the timeline further indicates an active status of a respective one of the plurality of security modes.

Clause 10. The method of any preceding clause, further comprising: generating, for display on the graphical user interface, a map of the environment, wherein the map includes a plurality of markers each indicating a respective location of a camera in the environment.

Clause 11. The method of any preceding clause, further comprising: updating, in response to detecting the start of the second security mode, a respective marker of the plurality of markers to be an active marker in response to determining that a respective camera associated with the respective marker is capturing a camera view in the second plurality of camera views; and updating, in response to detecting the start of the second security mode, another respective marker of the plurality of markers to be an inactive marker in response to determining that another respective camera associated with the another respective marker is capturing a different camera view not in the second plurality of camera views.

Clause 12. The method of any preceding clause, wherein relative to the inactive marker, the active marker has at least one of greater: size, brightness, or color saturation.

Clause 13. The method of any preceding clause, wherein the second security mode starts at the second time and ends at the third time on a periodic basis.

Clause 14. An apparatus for controlling a user interface of a video monitoring system, comprising: a memory; and a processor coupled with the memory and configured to: generate, at a first time, a graphical user interface that depicts a first plurality of camera views that correspond to a first camera view configuration of a first security mode captured from cameras installed in an environment; detect a start of a second security mode at a second time; update the graphical user interface to depict a second plurality of camera views that correspond to a second camera view configuration of the second security mode in response to detect the start of the second security mode; detect an end of the second security mode at a third time; and update the graphical user interface to depict a third plurality of camera views that correspond to a third camera view configuration of a third security mode in response to detect the end of the security mode.

Clause 15. The apparatus of clause 14, wherein to update the graphical user interface to depict the second plurality of camera views the processor is further configured to hide at least a portion of the first plurality of camera views.

Clause 16. The apparatus of any preceding clause, wherein relative to the first plurality of camera views, the second plurality of camera views have at least one camera view of greater: size, brightness, resolution, frame rate, or color saturation.

Clause 17. The apparatus of any preceding clause, wherein to update the graphical user interface to depict the second plurality of camera views the processor is further configured to depict the first plurality of camera views and the second plurality of camera views simultaneously.

Clause 18. The apparatus of any preceding clause, wherein the second plurality of camera views includes at least one different camera view than the first plurality of camera views.

Clause 19. The apparatus of any preceding clause, wherein the cameras capturing the first plurality of camera views are located in different areas of the environment than cameras capturing the second plurality of camera views.

Clause 20. The apparatus of clause 14, wherein the third security mode is a same mode as the first security mode.

Clause 21. The apparatus of any preceding clause, wherein the processor is further configured to: generate, for display on the graphical user interface, a timeline indicating start times and end times of a plurality of security modes for the environment, wherein the plurality of security modes comprises at least two of the first security mode, the second security mode, or the third security mode.

Clause 22. The apparatus of any preceding clause, wherein the timeline further indicates an active status of a respective one of the plurality of security modes.

Clause 23. The apparatus of any preceding clause, wherein the processor is further configured to: generate, for display on the graphical user interface, a map of the environment, wherein the map includes a plurality of markers each indicating a respective location of a camera in the environment.

Clause 24. The apparatus of any preceding clause, wherein the processor is further configured to: update, in response to detect the start of the second security mode, a respective marker of the plurality of markers to be an active marker in response to determine that a respective camera associated with the respective marker is capturing a camera view in the second plurality of camera views; and update, in response to detect the start of the second security mode, another respective marker of the plurality of markers to be an inactive marker in response to determine that another respective camera associated with the another respective marker is capturing a different camera view not in the second plurality of camera views.

Clause 25. The apparatus of any preceding clause, wherein relative to the inactive marker, the active marker has at least one of greater: size, brightness, or color saturation.

Clause 26. The apparatus of any preceding clause, wherein the second security mode starts at the second time and ends at the third time on a periodic basis.

Clause 27. A computer-readable medium having instructions stored thereon for controlling a user interface of a video monitoring system, wherein the instructions are executable by a processor to: generate, at a first time, a graphical user interface that depicts a first plurality of camera views that correspond to a first camera view configuration of a first security mode captured from cameras installed in an environment; detect a start of a second security mode at a second time; update the graphical user interface to depict a second plurality of camera views that correspond to a second camera view configuration of the second security mode in response to detect the start of the second security mode; detect an end of the second security mode at a third time; and update the graphical user interface to depict a third plurality of camera views that correspond to a third camera view configuration of a third security mode in response to detect the end of the security mode.

While the foregoing disclosure discusses illustrative aspects and/or embodiments, it should be noted that various changes and modifications could be made herein without departing from the scope of the described aspects and/or embodiments as defined by the appended claims. Further-more, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for controlling a user interface of a video monitoring system, comprising:

generating, by a processor at a first time, a graphical user interface that depicts a first plurality of camera views that correspond to a first camera view configuration of a first security mode captured from cameras installed in an environment;

generating, for display on the graphical user interface, a visual representation of the environment, wherein the visual representation includes a plurality of status indicators each indicating a respective location of a camera in the environment;

detecting, by the processor, a start of a second security mode at a second time;

updating, by the processor, the graphical user interface to depict a second plurality of camera views that correspond to a second camera view configuration of the second security mode in response to detecting the start of the second security mode;

updating, during the second security mode, a respective status indicator of the plurality of status indicators to active in response to determining that a respective camera associated with the respective status indicator is capturing a camera view in the second plurality of camera views;

updating, during the second security mode, another respective status indicator of the plurality of status indicators to inactive in response to determining that another respective camera associated with the another respective status indicator is capturing a different camera view not in the second plurality of camera views;

detecting, by the processor, an end of the second security mode at a third time; and updating, by the processor, the graphical user interface to depict a third plurality of camera views that correspond to a third camera view configuration of a third security mode in response to detecting the end of the second security mode.

2. The method of claim 1, wherein updating the graphical user interface to depict the second plurality of camera views further comprises hiding at least a portion of the first plurality of camera views.

3. The method of claim 1, wherein relative to the first plurality of camera views, the second plurality of camera views have at least one camera view of greater: size, brightness, resolution, frame rate, or color saturation.

4. The method of claim 3, wherein updating the graphical user interface to depict the second plurality of camera views further comprises depicting the first plurality of camera views and the second plurality of camera views simultaneously.

5. The method of claim 1, wherein the second plurality of camera views includes at least one different camera view than the first plurality of camera views.

6. The method of claim 1, wherein the cameras capturing the first plurality of camera views are located in different areas of the environment than cameras capturing the second plurality of camera views.

7. The method of claim 1, wherein the third security mode is a same mode as the first security mode.

8. The method of claim 1, further comprising:

generating, for display on the graphical user interface, a timeline indicating start times and end times of a plurality of security modes for the environment, wherein the plurality of security modes comprises at least two of the first security mode, the second security mode, or the third security mode.

9. The method of claim 8, wherein the timeline further indicates an active status of a respective one of the plurality of security modes.

10. The method of claim 1, wherein relative to the inactive status indicator, the active status indicator has at least one of greater: size, brightness, or color saturation.

11. The method of claim 1, wherein the second security mode starts at the second time and ends at the third time on a periodic basis.

12. An apparatus for controlling a user interface of a video monitoring system, comprising:

a memory; and a processor coupled with the memory and configured to:

generate, at a first time, a graphical user interface that depicts a first plurality of camera views that correspond to a first camera view configuration of a first security mode captured from cameras installed in an environment;

generate, for display on the graphical user interface, a visual representation of the environment, wherein the visual representation includes a plurality of status indicators each indicating a respective location of a camera in the environment;

detect a start of a second security mode at a second time;

update the graphical user interface to depict a second plurality of camera views that correspond to a second camera view configuration of the second security mode in response to detect the start of the second security mode;

update, during the second security mode, a respective status indicator of the plurality of status indicators to active in response to determining that a respective camera associated with the respective status indicator is capturing a camera view in the second plurality of camera views;

update, during the second security mode, another respective status indicator of the plurality of status indicators to inactive in response to determining that another respective camera associated with the another respective status indicator is capturing a different camera view not in the second plurality of camera views;

detect an end of the second security mode at a third time; and update the graphical user interface to depict a third plurality of camera views that correspond to a third camera view configuration of a third security mode in response to detect the end of the second security mode.

13. The apparatus of claim 12, wherein to update the graphical user interface to depict the second plurality of camera views the processor is further configured to hide at least a portion of the first plurality of camera views.

14. The apparatus of claim 12, wherein relative to the first plurality of camera views, the second plurality of camera views have at least one camera view of greater: size, brightness, resolution, frame rate, or color saturation.

15. The apparatus of claim 14, wherein to update the graphical user interface to depict the second plurality of camera views the processor is further configured to depict the first plurality of camera views and the second plurality of camera views simultaneously.

16. The apparatus of claim 12, wherein the second plurality of camera views includes at least one different camera view than the first plurality of camera views.

17. The apparatus of claim 12, wherein the cameras capturing the first plurality of camera views are located in different areas of the environment than cameras capturing the second plurality of camera views.

18. The apparatus of claim 12, wherein the third security mode is a same mode as the first security mode.

19. The apparatus of claim 12, wherein the processor is further configured to:

generate, for display on the graphical user interface, a timeline indicating start times and end times of a plurality of security modes for the environment, wherein the plurality of security modes comprises at least two of the first security mode, the second security mode, or the third security mode.

20. The apparatus of claim 19, wherein the timeline further indicates an active status of a respective one of the plurality of security modes.

21. The apparatus of claim 12, wherein relative to the inactive status indicator, the active status indicator has at least one of greater: size, brightness, or color saturation.

22. The apparatus of claim 12, wherein the second security mode starts at the second time and ends at the third time on a periodic basis.

23. A non-transitory computer-readable medium having instructions stored thereon for controlling a user interface of a video monitoring system, wherein the instructions are executable by a processor to:

generate, at a first time, a graphical user interface that depicts a first plurality of camera views that correspond to a first camera view configuration of a first security mode captured from cameras installed in an environment;

generate, for display on the graphical user interface, a visual representation of the environment, wherein the visual representation includes a plurality of status indicators each indicating a respective location of a camera in the environment;

detect a start of a second security mode at a second time;

update the graphical user interface to depict a second plurality of camera views that correspond to a second camera view configuration of the second security mode in response to detect the start of the second security mode;

update, during the second security mode, a respective status indicator of the plurality of status indicators to active in response to determining that a respective camera associated with the respective status indicator is capturing a camera view in the second plurality of camera views;

update, during the second security mode, another respective status indicator of the plurality of status indicators to inactive in response to determining that another respective camera associated with the another respective status indicator is capturing a different camera view not in the second plurality of camera views;

detect an end of the second security mode at a third time; and update the graphical user interface to depict a third plurality of camera views that correspond to a third camera view configuration of a third security mode in response to detect the end of the second security mode.

24. The non-transitory computer-readable medium of claim 23, wherein the instructions are further executable by the processor to detect the start of the second security mode at the second time and the end of the second security mode at the third time based on a pre-defined schedule.

25. The method of claim 1, wherein detecting the start of the second security mode at the second time and the end of the second security mode at the third time is based on a pre-defined schedule.

26. The apparatus of claim 12, wherein the processor is further configured to detect the start of the second security mode at the second time and the end of the second security mode at the third time based on a pre-defined schedule.

* * * * *